US006681625B1

United States Patent
Berkcan et al.

(10) Patent No.: US 6,681,625 B1
(45) Date of Patent: Jan. 27, 2004

(54) CONSTANT-TEMPERATURE-DIFFERENCE BIDIRECTIONAL FLOW SENSOR

(75) Inventors: Ertugrul Berkcan, Niskayuna, NY (US); Scott Baxter Hoyle, Maple Shade, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/487,848

(22) Filed: Jan. 19, 2000

(51) Int. Cl.[7] ................................................. G01F 1/68
(52) U.S. Cl. ................................ 73/204.23; 73/204.27; 73/204.15
(58) Field of Search .......................... 73/204.14, 204.15, 73/204.16, 204.19, 204.27, 204.23

(56) References Cited

U.S. PATENT DOCUMENTS

| | | | | | |
|---|---|---|---|---|---|
| 4,319,483 A | * | 3/1982 | Durham et al. | ........... | 73/204.15 |
| 4,548,078 A | * | 10/1985 | Bohrer et al. | ............. | 73/204.26 |
| 4,677,850 A | * | 7/1987 | Miura et al. | .............. | 73/204.15 |
| 5,212,983 A | * | 5/1993 | Ott et al. | ................... | 73/204.15 |
| 5,218,866 A | * | 6/1993 | Phillips et al. | ........... | 73/170.12 |
| 5,222,395 A | * | 6/1993 | Matubara et al. | ........ | 73/204.18 |
| 5,237,867 A | * | 8/1993 | Cook, Jr. | ................... | 73/204.15 |
| 5,460,039 A | * | 10/1995 | Cutler | ...................... | 73/204.15 |
| 5,461,910 A | * | 10/1995 | Hodson et al. | ........... | 73/204.16 |
| 5,465,618 A | * | 11/1995 | Yasui et al. | ................. | 73/118.2 |
| 5,493,100 A | * | 2/1996 | Renger | ..................... | 73/204.19 |
| 5,533,412 A | * | 7/1996 | Jerman et al. | ............ | 73/204.26 |
| 5,576,487 A | * | 11/1996 | Gimson | .................... | 73/204.11 |
| 5,792,952 A | * | 8/1998 | Ritchart | .................... | 72/204.27 |

* cited by examiner

*Primary Examiner*—Harshad Patel
(74) *Attorney, Agent, or Firm*—Duane Morris LLP

(57) ABSTRACT

A bidirectional flow sensor (800) for automated systems includes a heater (18) which is maintained at a constant temperature above the temperature of the fluid flowing past the heater. A pair of temperature sensors (26a,26b) is located to either side of the heater (18). The temperature sensors may be two-terminal constant-current devices, electrically connected in series, so that the current is controlled by the sensor sensing the lower temperature, which is on the upstream side of the heater. In one embodiment, a processor (1010) processes the signals produced by the temperature sensors to produce a flow-direction indicating signal. The bidirectional sensor is adapted for interfacing with a digital network.

26 Claims, 12 Drawing Sheets

CONSTANT-TEMPERATURE-DIFFERENCE BIDIRECTIONAL FLOW SENSOR

FIELD OF THE INVENTION

This invention relates to integrated flow and temperature sensors for fluids, and more particularly to bidirectional flow sensors in which a heater is maintained at a constant temperature differential above the temperature of the flowing fluid.

BACKGROUND OF THE INVENTION

Modern ships employ crew members whose function is to monitor various parts of the vessel, and to operate equipment such as hoists, radar, bridge equipment, and to monitor and control valves located throughout the ship. The costs associated with maintaining a large crew are disadvantageous, and such costs include the costs associated with paying wages, maintaining the crew member in terms of food and life support (bathrooms, hot water, and the like), and also includes the costs of training the crew member for the particular job. To the extent that a ship's functions can be automated, the necessary crew can be reduced.

The problem is particularly acute in war vessels, as a relatively large crew must be maintained in order to have the resources to perform battle damage repair and recovery.

If reliable and inexpensive integrated flow sensors were available, such sensors could be located in various pipes within a ship or a factory, and their readings could be compared to determine if there were a break or leak (break) in the intervening pipe or flow path. Once identified, the damaged flow paths could be disabled by remotely-controllable valves. These flow sensors could also advantageously be used with integrated pressure sensors for determination of the state of the fluid system. Such inexpensive sensors could also be used to improve process controls in chemical and other processes.

Present-day flow sensors include rotating-propeller or linear types, differential-pressure aperture, ball-in-tapered-tube, vane or deflection type, ultrasonic, and hot-wire anemometer. The rotating-propeller is very accurate, but may degrade over time as a function of corrosion and deposits, and may fail catastrophically in the presence of large debris. The differential-pressure type of flow sensor requires an obstructing aperture or change of geometry of the flow path, which is very undesirable, and when the application requires many such sensors to be cascaded, may substantially impede the flow. Also, the small pressure changes attributable to relatively large apertures may undesirably introduce noise into the measurement. The ball-in-tube type requires a vertical orientation, and the tube must be transparent in order to optically detect the location of the ball. Additionally, in a vehicle which has vertical motion, the vertical acceleration tends to add to the gravitational force acting on the ball, and will tend to affect the reading, and therefore the accuracy. The vane deflection type of flow sensor obstructs the flow with the vane, and is not known for its accuracy. The ultrasonic type of flow sensor does not necessarily impede the flow, but is expensive, and may not be suitable for use in a noisy environment, or in an environment in which many such sensors are in use, so that the ultrasonic signals of one affect the others in the same flow path. The hot-wire anemometer is not known for use in fluids other than air, would not work in a conductive fluid, and the thin wire would be subject to breakage by circulating debris in some applications.

FIG. 1a is an illustration of a flow sensor as described in copending patent application Ser. No. 09/349,576, filed Jul. 8, 1999 in the name of the inventors herein. In FIG. 1a, a sensor 10 includes a fluid path 12 in the form of a round pipe 14 through which fluid flows in a direction designated by an arrow 16. Sensor 10 supports an annular peripheral electrical heating element or heater 18. A flow of electrical energy or power is applied to heater 18 from a controller 20 by way of a set 22 of wires. A temperature sensor 24 is coupled to heating element 18, for producing a signal representing the temperature of the heating element. The temperature-representative signal is applied to controller 20 by way of a set of wires 24w. Controller 20 includes a memory (Mem) designated 21. A further temperature sensor 26 is mounted to pipe 14 at a location upstream from heating element 18, for sensing the temperature of the fluid flowing in pipe 14, and for generating a signal representing the temperature of the fluid. The signal representing the temperature of the fluid is applied over a set of wires 26w to controller 20.

FIG. 1b is a representation of a cross-section of the structure of FIG. 1a. In FIG. 1b, the wall of pipe 14 is made from conventional materials, designated as 33. The conventional materials may, depending-upon the temperature and pressure of the fluid flowing in path 12, be materials such as brass, galvanized steel, stainless steel, or composite materials. In the sensing region 36, the pipe wall can be made of the same material as pipe 14, or can be made from a high-strength material 34, as for example titanium, which can be substantially thinner in cross-section than the conventional materials 33. This thinner cross-section, in turn, generally translates into better thermal transfer properties between the heater 18, the sensors 24 and 26, and the fluid within the sensing region 36. The sensing region 36 is connected to pipe 14 using standard connecting techniques.

In operation of the sensor 10 of FIG. 1a, the velocity of the flow of fluid is determined by sensing the upstream fluid temperature with sensor 26, and applying electrical energy from the controller 20 to the heating element 18 at a rate sufficient to raise the temperature of the heating element, as measured by sensor 24, to a second temperature, greater than the upstream-fluid temperature, by a fixed temperature difference. The measurement of power or the time rate of energy required to maintain the fixed temperature difference is an indication of the velocity of fluid flow in the fluid path.

In an alternative arrangement that provides a lower-cost, but lower-accuracy solution, upstream fluid temperature is estimated, rather than directly sensed, based on details of the system into which the sensor is installed. For example, if the upstream fluid is water which comes from the bottom of a lake in which the water temperature always remains at about 55° F., the upstream temperature measurement is not needed, and the upstream temperature may be assumed. This estimation obviates the need for upstream temperature sensor 26. All calculations are then based on the assumed upstream temperature.

In yet another alternative arrangement, the heater 18 of FIG. 1a is turned off periodically and allowed to attain the temperature of the fluid to provide the ambient, or upstream value. This heater-ON to heater-OFF duty cycle or period depends upon the thermal characteristics of the fluid, the sensor wall 14 (or 34) of FIG. 1b, and the expected temperature range of the fluid.

Once the fluid flow rate is known, the volume flow rate (gallons per minute, for example) is easily determined to be the product of the effective cross-section of the fluid path (the diameter of the pipe, taking into account boundary effects) multiplied by the fluid flow velocity. Given the density of the fluid, the mass flow rate (kilograms per second, for example) is easily determined as the product of the volume flow rate multiplied by the density of the fluid. Controller 20 produces a signal representing one (or all) of fluid velocity, volume flow rate, and mass flow rate, and applies it over a signal path 20w to a remote indicator (not illustrated).

FIG. 2a is a simplified schematic diagram of an analog embodiment of a temperature controller 220 which may be used in controller 20 of FIG. 1a to maintain the heater temperature at a fixed value above the temperature of the upstream fluid. In FIG. 2a, heater 18 is illustrated as a resistor having a resistance designated as $R_{heater}$. One end of resistor 18 is grounded, and the other is connected to the output port 322o of a driver circuit 322. In practice, as illustrated in FIG. 2b, driver circuit 322 may be as simple a circuit as a power field-effect device 352 having its source 352s connected to output port 322o, its drain 352d connected to a supply voltage source V, and its gate 352g coupled to resistor 232. Resistor 18 of FIG. 2a is thermally coupled to temperature sensor 24, as illustrated by dash-line path 224. Sensor 24 is coupled with a tapped resistor 226 to form a voltage divider coupled between a bus Vdd and ground, to thereby provide, at its tap, a voltage having a value lying between Vdd and ground. Similarly, sensor 26 is connected with a resistor 228 as a voltage divider coupled between Vdd and ground, to thereby provide, at its tap, a voltage having a value lying between Vdd and ground. Sensors 24 and 26 may be thermistors or other temperature-sensitive resistance devices, as known in the art. If sensors 24 and 26 (or their outputs), and their associated resistors 226 and 228, respectively, are matched to each other, the same voltage will appear across the resistors 226 and 228. If the temperature of heating element 18 as measured by sensor 24 were to be slightly higher than that measured by sensor 26 and sensor 24 had a negative temperature coefficient, sensor 24 would have a slightly higher output than sensor 26, and the voltage across resistor 226 would be slightly greater than the voltage across resistor 228. Instead of temperature-sensitive resistance devices, "two-terminal IC temperature transducers" might be used for temperature sensors 24 and/or 26. Such IC sensors have a constant-current temperature characteristic which depends upon the sensed temperature. Within the range of operating voltage, such a temperature sensor has a high impedance providing constant current regardless of the applied voltage, and the constant current is a function of the sensed temperature. Such sensors are fabricated by Analog Devices, of Norwood, Mass. as type AD590, with various ranges of accuracy or error. Regardless of the sensor type, the connections of sensors 24 and 26 as illustrated in FIG. 2a, serially connected with resistors 226 and 228, respectively, across the supply voltage Vdd-to-ground, may still be viewed as voltage dividers, since the constant-current characteristic of the IC sensors effectively modifies the impedance of the sensor in response to voltage changes in order to maintain the constant current. Thus, description of the sensor-resistor combination as a voltage divider is applicable to both the thermistor-type and IC-type sensors when each is connected in series with a resistor. In actuality, the operation of the IC sensors is substantially more complicated, and is not treated here.

An operational amplifier 230 of FIG. 2a has its output port 230o coupled, by way of a limiting resistor 232, to the input port 322i of driver circuit 322. Amplifier 230 has its noninverting (+) differential input port coupled by way of a path 234 to the junction of sensor 26 and resistor 228, for sensing the reference voltage, and the inverting (−) differential input port of amplifier 230 is connected to the movable tap 226m of resistor 226. The movable tap 226m can be set so that, when the temperature sensed by sensor 24 is slightly greater than the temperature sensed by sensor 26, the voltages at the inverting and noninverting input ports of amplifier 230 are essentially equal. Those skilled in the art will recognize the arrangement of FIG. 2a as a simple feedback control circuit, which tends to maintain the amount of current through heating element 18 at a value which results in a constant temperature. Simple filters (not illustrated in FIG. 2a) can be used in conjunction with operational amplifier 230 to control the time constant of the feedback circuit. When the tap 226m of resistor 226 is set to sense a slightly lower voltage than that across resistor 226 as a whole, the feedback circuit 220 of FIG. 2a will act to maintain the heating element 18 at a temperature which is higher by a preset amount than the temperature sensed by sensor 26. Thus, the position of tap 226m of resistor 226 can be used to set or adjust the amount by which the temperature of heating element 18 is kept above the temperature sensed by sensor 26 in an analog feedback circuit such as circuit 220 of FIG. 2a.

FIG. 3 differs from FIG. 2a in that a digital circuit 330 replaces the analog operational amplifier 230. In FIG. 3, digital circuit 330 includes an integrated processor 332 which includes analog input ports $332_1$, and $332_2$ to which the temperature reference signals are applied from temperature sensors 24 and 26, respectively. Processor 332 also includes a set of ports designated generally as $332_p$, at which the various bits of a digital signal are accessed. Thus, one of the individual ports of set $332_p$ is designated as carrying the least-significant bit (LSB), another as carrying the most-significant bit (MSB), and the other ports (not designated) carry bits of intermediate significance. The bit signals carried by the ports of set $332_p$ are applied to the input ports of a digital-to-analog converter (DAC) 334, which, as known, converts the digital signals into a corresponding quantized-analog signal on output signal path 334o. The analog signal is applied to a driver circuit 322. The integrated processor 330 of FIG. 2a may be a specialized integrated device such as Neuron processor MC143150 or the like, made by Motorola company of Schaumberg, Ill., under license from Echelon Company of Palo Alto, Calif. These processors are convenient for such use, because they include several desired functions, and further include a communication interface, illustrated as 332b in FIG. 3, which can be connected to a communication channel 340, such as a twisted pair, power line carrier, RF channel, or the like, in an automated system.

In operation of the arrangement of FIG. 3, the integrated processor 332 calculates an output voltage based on the sensed temperatures 24 and 26, and outputs or generates a digital value on signal paths 332p, which value is then converted by digital-to-analog converter (DAC) 334 into an analog version of this output voltage. In essence, the processor 332 performs the function of a feedback control circuit, which will maintain the amount of electrical current through heating element 18 at a value sufficient to maintain the heating element at a specified value above the temperature measured by sensor 26. Compared with the feedback circuit using the Op-Amp 230 in FIG. 2a, however, characteristics of this feedback, such as the temperature difference between the heater and the fluid, or the applicability to a different type of fluid, is programmable or software-adjustable (commandable), and independent of the setting of a variable resistor, such as 226 of FIG. 2a. Consequently, no adjustable voltage divider is necessary in the arrangement of FIG. 3.

FIG. 4 is similar to FIG. 3, but the processor 332 is arranged to produce, on signal path 342, a bi-level pulse-width modulated (PWM) output signal representative of the desired power or current to be applied to resistor 18. The pulse-width modulated signal is applied to the input of driver circuit 322. The heating element 18 in this circuit is driven by full-amplitude PWM signal rather than by a modulated-amplitude quantized-analog signal. This allows a direct connection between the integrated processor 332 and the driver circuit 322, and thereby eliminates the need for the digital-to-analog converter 334 of FIG. 3. When automated systems are to be used, it is often desirable to minimize the cost of each sensor used in the system. Deletion of the digital-to-analog converter aids in reducing cost and complexity of the assembly, and the simplification and reduction in the number of parts may be expected to improve reliability. Alternatively, a simple solid-state processor can be used. Moreover, a PWM type of output is readily available from a number of commercially available processors at little or no additional cost.

FIG. 5 illustrates a hybrid analog/digital temperature controller which may be used in the controller 20 of FIG. 1a. In FIG. 5, heater 18 is driven by driver block 322, which in turn is controlled by the analog output signal from an operational amplifier 230. The inverting input port of amplifier 230 is connected to the movable tap 226m on resistor 226, and resistor 226 is connected in series with temperature sensor 24 between voltage source Vdd and ground. Temperature sensor 26 is connected with resistor 228 as a voltage divider to produce a voltage output at its tap, and the voltage at the tap is applied to an integrated processor 330, which converts the analog voltage across resistor 228 into digital form, and provides the digital information to system bus 340. Movable tap 226m is connected to integrated processor 332 by a path 331 so as to make the temperature sensed by sensor 24 available to the system bus 340. The analog output signal of Neuron chip or processor module 330 is connected to the noninverting input port of amplifier 230. The operation of the arrangement of FIG. 5 is similar to that of the arrangement of FIG. 2a, with the only difference lying in the digitization of the voltage across resistor 228, and the reconversion of the digitized value to analog form for application to amplifier 230. It will be apparent that the connection to the operational amplifier through the digital circuits 330 can be made for the temperature sensed by sensor 24 instead of for the temperature sensed by sensor 26. In this latter version, the variable resistor 226 can be replaced by a fixed resistor.

FIG. 6 illustrates an arrangement similar to that of FIG. 5, in which both the temperature-representative signals from resistors 226 and 228 are digitized within Neuron processor or integrated processor 330, and reconverted into analog form for application to the amplifier 230. In view of the detailed descriptions of FIGS. 2a, 3, 4, and 5, it is only necessary to state that the module with integrated processor 330 includes two analog input ports, one for each temperature-related signal, and two analog output ports, designated 332P$_1$ and 332P$_2$, at which two analog temperature-representative signals appear. As in the other embodiments, the temperature sensors 24 and 26 may be temperature-sensitive resistors or constant-current sources. No further description of FIG. 6 is believed to be necessary for an understanding of the temperature control aspects of the system.

In addition to control of the temperature of the heater as described above, controller 20 of FIG. 1a also performs further processing of the temperature information, together with memorized information, in order to determine the flow velocity through the path. The flow velocity v is given by $$v = \left[k_1\left(\frac{E^2}{\Delta TR_{heater}}\right) - k_2\right]^{\frac{1}{m}} \qquad 1$$

where:

$k_1$ is a constant dependent upon wall temperature and the Prandtl number ($N_{Pr}$), which is the ratio of molecular momentum to thermal diffusivity;

$\Delta T$ is the temperature increment of the heater over the fluid temperature;

$k_2$ is a correction factor dependent upon the characteristics of the heater 18, the material 34, and the thermal connection therebetween; and m is a power or correction factor which is dependent upon the thermal electrical characteristics of the heater 18;

$R_{heater}$ is the electrical resistance of the heater; and

E is the voltage across the heater resistor.

In actual practice, the above equation (1), or equations obtained by similar derivations, may not provide as precise a reading or value as desired, due to the difficulty of determining the constants. A more precise value for the flow can be obtained by evaluating a polynomial, such as a 5$^{th}$ order polynomial of the form a+bx+cx$^2$+dx$^3$+ex$^4$+fx$^5$, and determining the values of the coefficients of the polynomial by a calibration of the flow sensor against a known reference flow sensor placed in-line with the flow sensor being calibrated. The processing required in the controller 20 of FIG. 1 to evaluate such equations is straightforward, and requires no further description.

Once the flow velocity is determined by use of the processing described above, the flow may be determined in terms of volumetric flow (volume per unit time) by multiplying the flow velocity by the effective cross-section of the path or pipe in which the fluid is flowing. Ordinarily, the area is simply determined from the diameter of the pipe in which the flow is occurring. The processor memory 21 will, for this purpose, be preprogrammed with the characteristics of the flow sensor path, possibly including such a characteristic as area of the pipe with which the flow sensor is associated. The mass flow rate (mass per unit time) is simply determined by multiplying the volumetric flow rate by the mass density of the fluid. For this purpose, the processor of controller 20 of FIG. 1a which performs the processing will be preprogrammed with the characteristics of the fluid being measured and the physical dimensions of the fluid path. This information may be preprogrammed at the factory, or, if the type of fluid may change from time to time, the mass density characteristics may be uploaded to the processor memory by way of bus 20w of FIG. 1a or 340 of FIG. 3, 4, 5, 6, or 7. The resulting velocity, volumetric, or mass flow rate (or all of them) is (or are) transmitted from the sensor 10 over the bus 20w of FIG. 1a or 340 of FIGS. 3, 4, 5, 6, and/or 7 to a other locations or to a central location for use such as monitoring and/or control.

In another version, the heater resistor is used to detect the temperature, thereby obviating the need for a physical temperature-measuring device such as 24 of FIG. 1a. More particularly, the heater is made from a material, such as nickel or platinum, whose resistance $R_{heater}$ changes with temperature, and the resistance of the heater is used as a measure of the temperature of the heater. In a first embodiment of this version, the processor is time-alternately provided with voltage across (a) the precision resistor 180 and (b) the heater resistor 18 as shown in the system 700 of FIG. 7. Provision is also made for measuring these voltages (E) across the precision resistor 180 and the heater resistor 18. Signals representing the sensed heater voltages and current are applied to the processor for determination of the heater resistance. In this arrangement, the current through the heater is determined during the "a" intervals. In this arrangement, the resistance of the heater resistor is determined during the "b" intervals or periods, as the quotient of E/I, and this resistance value is applied to a ROM for read-out of the corresponding temperature. In such an arrangement, the temperature sensing and the heating aspect of the flow determination are time-division multiplexed. Such an arrangement has the advantage of further reducing the number of parts in the assemblage, and substitutes solid-state control and processing for the second temperature sensor.

As an alternative to time-division multiplexing of the temperature-sensing and power-applying functions associated with the heater, the power-applying function may be performed continuously, and the resistance determination for temperature determination may be performed by simply measuring the applied electrical voltage (E) and the resulting current (I), and taking the quotient of E/I.

Bidirectional flow sensors are desired.

SUMMARY OF THE INVENTION

A method according to an aspect of the invention, for determining the flow of a fluid through a region, includes the step of determining the temperature of a fluid flowing in a path, at first and second spaced-apart locations along the path. The method also includes the step of applying power to a heater thermally coupled to the path at a location lying between the first and second spaced-apart locations, for raising the temperature of the heater by a fixed temperature differential above the lesser of the temperature of the fluid at the first and second locations, and, using at least information equivalent or corresponding to one of the specific heat of the fluid, the exposed area of the heater, the power required to sustain the temperature differential, the power transfer characteristics per unit area of the heater to the fluid, and the exposed area of the heater, determining the fluid flow. In a particular mode, the method includes the step of determining the volumetric flow from the fluid flow and information equivalent to the cross-sectional area of the path. In another mode, the method includes the step of determining the mass flow from the volumetric flow and information equivalent to the mass density of the fluid. In a particularly advantageous mode of the invention, the signals from the temperature sensors produce information relating to the direction of the fluid flow, as well as the flow magnitude.

A bidirectional fluid flow sensor according to an aspect of the invention includes a path for the flow of fluid in mutually opposite first and second directions, and a heater thermally coupled to the path, for transferring heat to the fluid at a first location along the path. A first electrically responsive temperature sensor is located downstream from the heater for the first direction of fluid flow. The first temperature sensor has a temperature-dependent constant-electrical-current characteristic. A second electrically responsive temperature sensor is located downstream from the heater for the second direction of fluid flow, and the second temperature sensor has a temperature-dependent constant-electrical-current characteristic which may differ from that of the first electrically responsive temperature sensor. Ideally, this difference is attributable to a temperature difference between the fluid at the first and second locations. An electrical coupler or circuit is electrically coupled to the first and second electrically responsive temperature sensors, for coupling the sensors in electrical series in a manner which results in a electrical combined sensor current which depends only on that one of the sensors providing the lesser constant electrical current. In this fashion, the electrical current through the series-connected temperature sensors equals the electrical current which would be produced by that one of the sensors producing the least current. In a particular embodiment of the invention in which the series-connected temperature sensors are solid-state two-terminal integrated-circuit temperature transducers operable with a direct-voltage supply in the range of about 4 to 30 volts, the electrical current through the series-connected sensors equals that current which would occur through the sensor sensing the lower temperature if it were not connected in series. The bidirectional flow sensor includes a controller coupled to the electrical coupler and to the heater, for controlling the power applied to the heater in a manner which tends to maintain the heater at a fixed temperature difference above the temperature sensed by that one of the sensors providing the lesser constant electrical current. A processor is provided for converting the power applied to the heater into an indication of flow.

In an advantageous embodiment of the invention, the signals appearing across the temperature sensors are compared to produce information relating to the direction of fluid flow.

In another advantageous embodiment of the bidirectional flow sensor according to an aspect of the invention, the controller comprises a heater temperature sensor coupled to the heater, for determining the temperature of the heater. This heater temperature sensor may include an electrical resistor associated with the heater, and a processing arrangement for determining the electrical resistance of the electrical resistor. In the most preferred embodiment, the electrical resistor and the heater are one and the same element, in which case the heater temperature sensor further comprises a resistance determining arrangement coupled to the electrical resistor for measuring the electrical resistance of the heater.

Other embodiment include one in which (a) the controller comprises a memory preprogrammed with a value corresponding to the cross-sectional area of the path, so that the flow determination is in the form of one of mass quantity per unit time and volume per unit time, (b) the path is associated with a pipe having a peripheral wall, and the heater is in the form of a peripheral structure surrounding the peripheral wall, and in thermal contact therewith, and/or (c) the peripheral wall of the pipe is made from conventional materials having a thickness commensurate with the pressure and temperature of the fluid, except in the region in which the heater is thermally coupled, in which region the peripheral wall is made from a material having higher strength than the conventional materials, of a thickness less than the commensurate thickness.

BRIEF DESCRIPTION OF THE DRAWING

FIG. 9b is a simplified diagram in block and schematic form, illustrating a control circuit similar to that of FIG. 2a;

DESCRIPTION OF THE INVENTION

Figure 1:
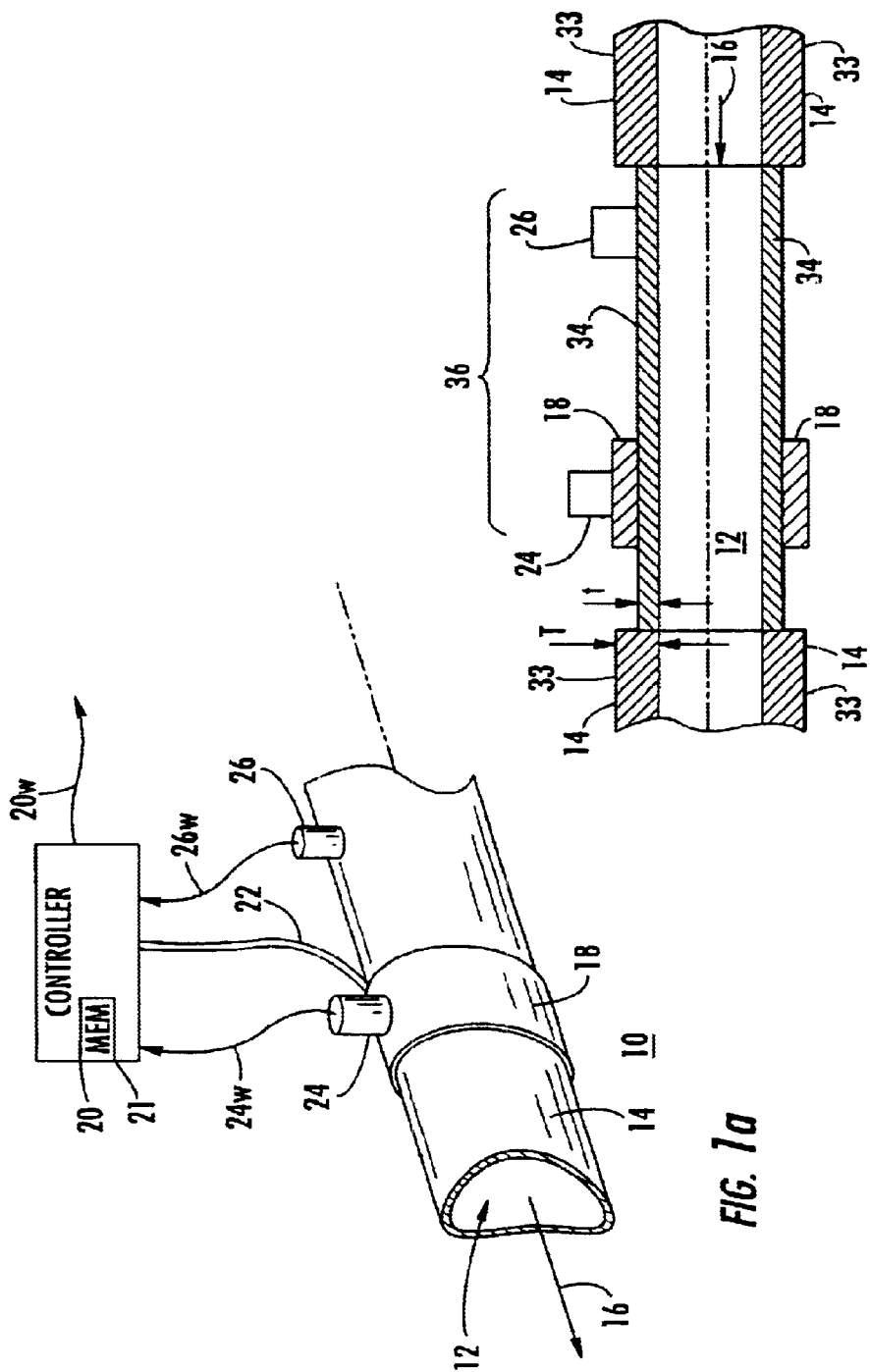
FIG. 1*a* is a simplified diagram of a flow sensor using a heater, which uses a heater, two temperature sensors, and a controller, which flow sensor may be used in an integrated pressure-and-flow sensor.
FIG. 1*b* is a cross-sectional view thereof.
Figure 8:
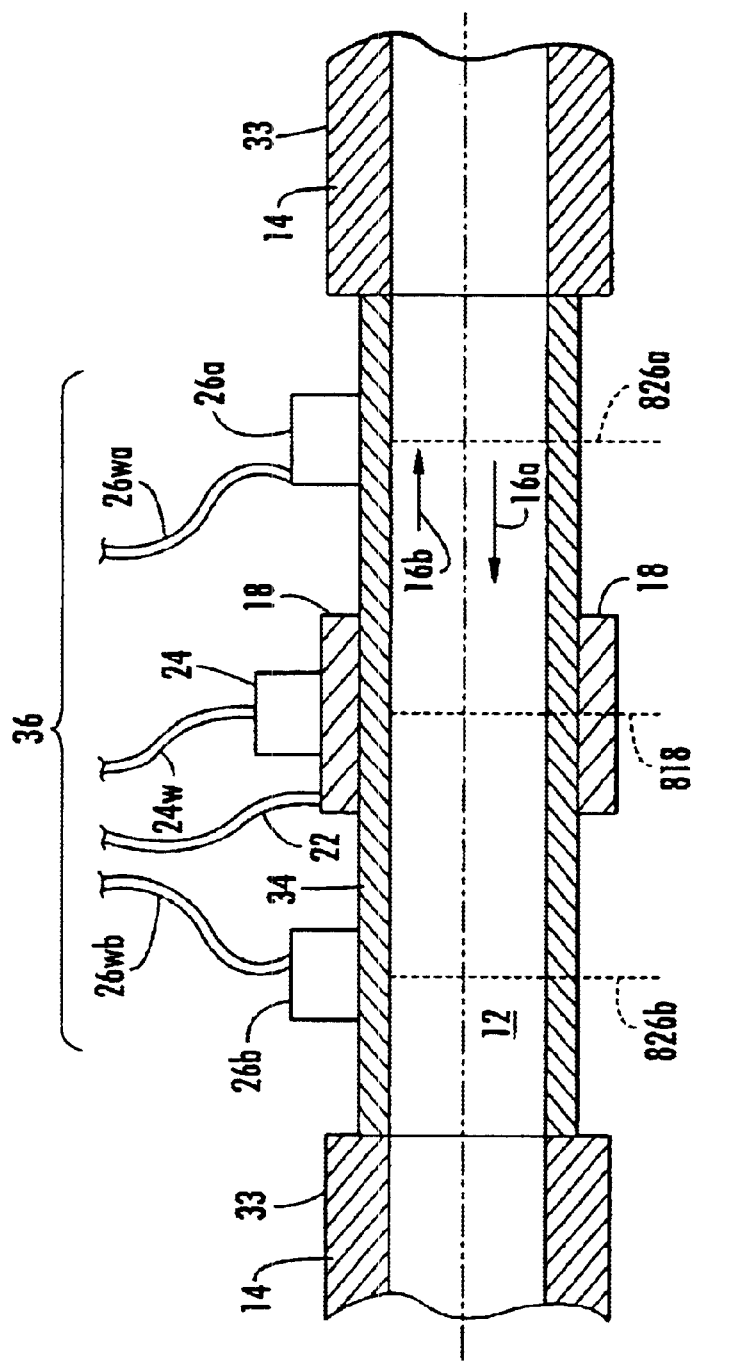
FIG. 8 is a cross-sectional diagram of a bidirectional flow sensor in accordance with an aspect of the invention, illustrating the use of two separate temperature sensors, on either side (in relation to the flow direction) of the heating element.

FIG. 8 is similar to FIG. 1b, but includes two fluid temperature sensors corresponding to 26 of FIG. 1b, which are redesignated 26a and 26b to distinguish therebetween. The two fluid temperature or reference temperature sensors 26a and 26b are placed at planes 826a and 826b, respectively, spaced apart along the fluid path 12, and are located so that the heater 18 lies at a plane 818 lying between the reference temperature sensors 26a and 26b. The purpose of this arrangement is to provide an "upstream" temperature sensor for reference purposes regardless of the direction of fluid flow. For example, if the fluid flow is in the direction represented by arrow 16a in FIG. 8, then temperature sensor 26a is upstream, and senses the fluid temperature before heating by heater 18. Similarly, if the fluid flow is in the direction represented by arrow 16b, temperature sensor 26b is the upstream sensor.

Figure 2:
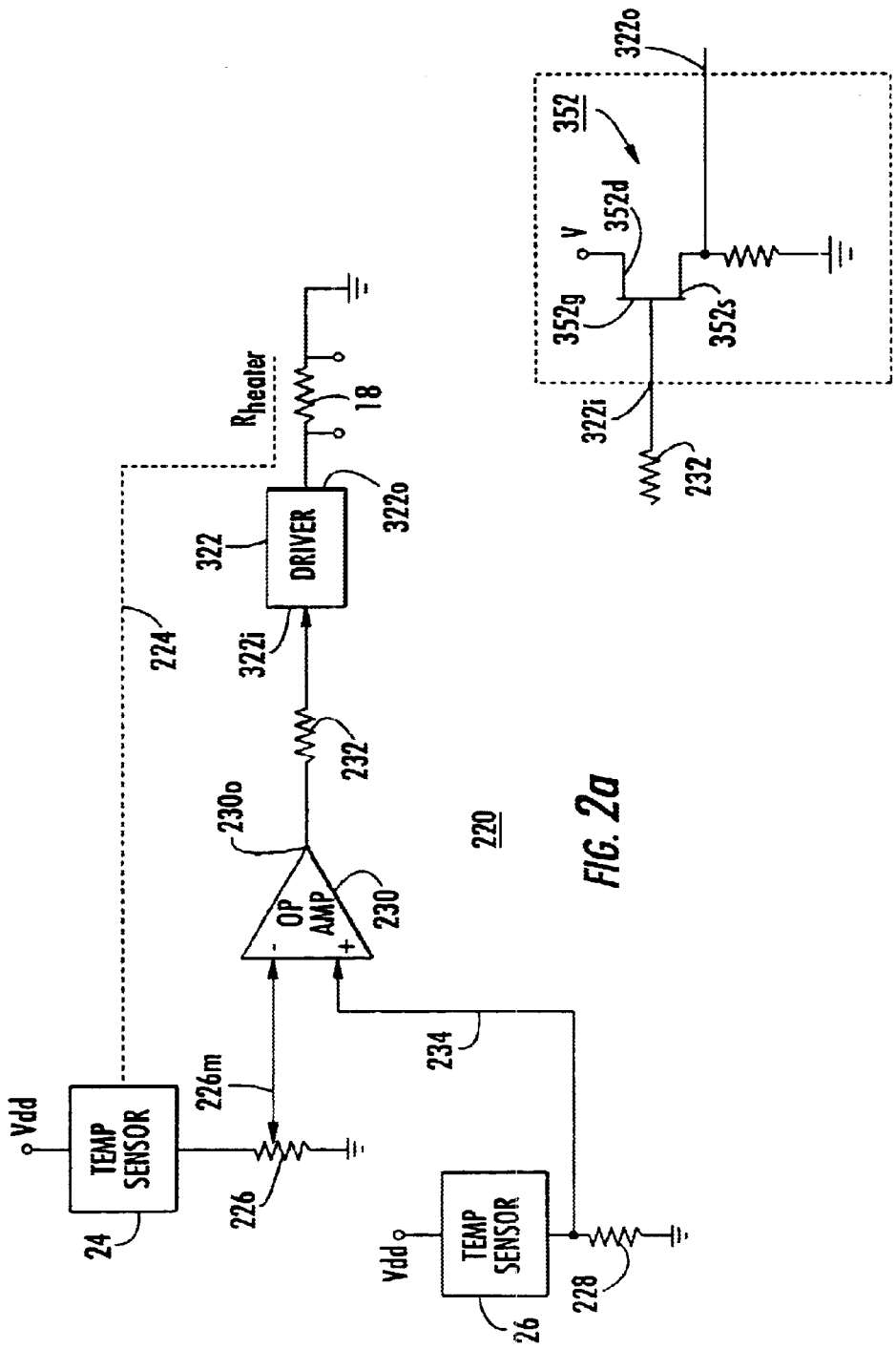
FIG. 2*a* is a simplified schematic diagram of an analog temperature controlling circuit which may be used in conjunction with the flow sensor of FIG. 1.
FIG. 2*b* illustrates a portion thereof.
Figure 3:
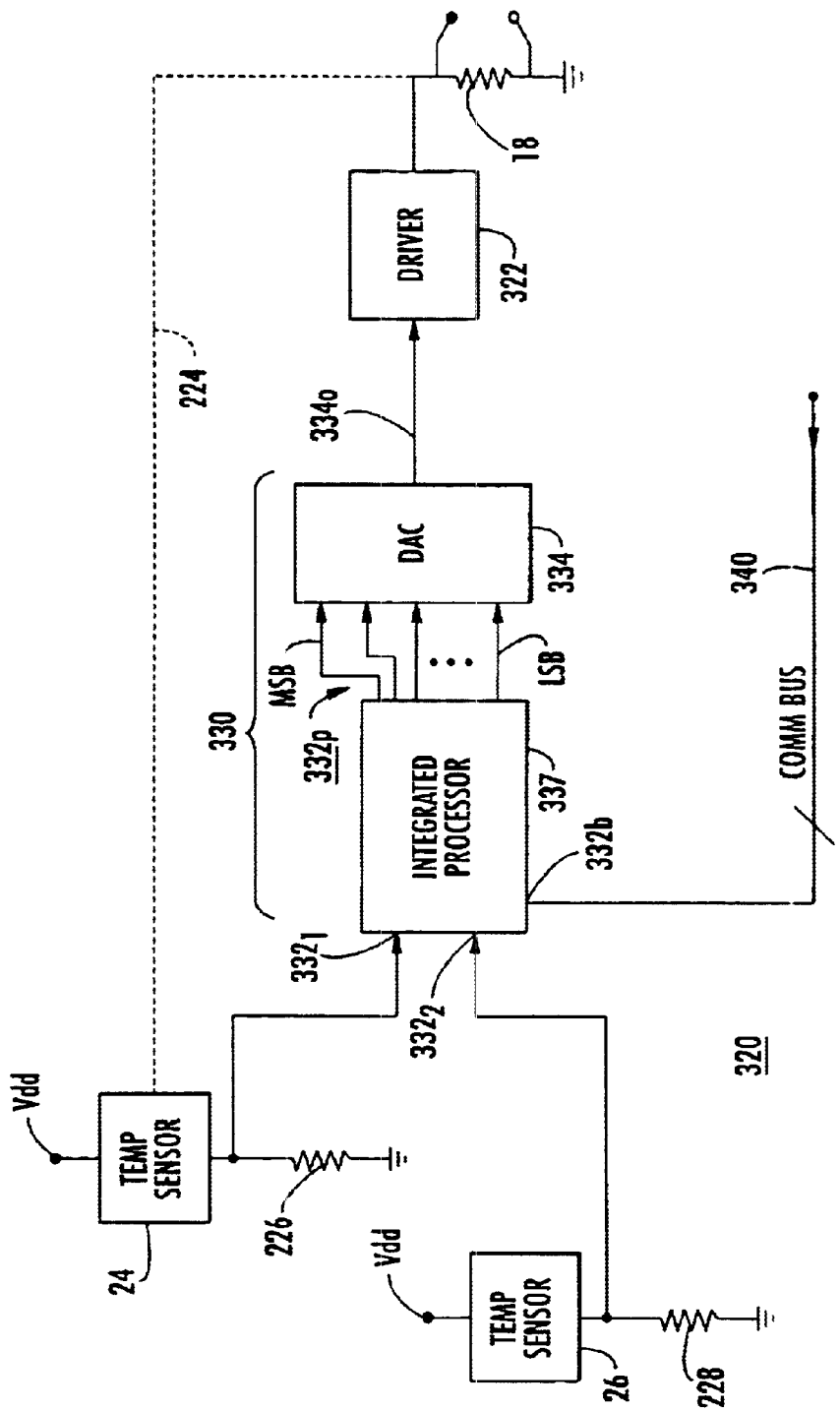
FIG. 3 is a simplified schematic diagram of a digital-based temperature controlling circuit using a digital-to-analog converter (DAC)
Figure 4:
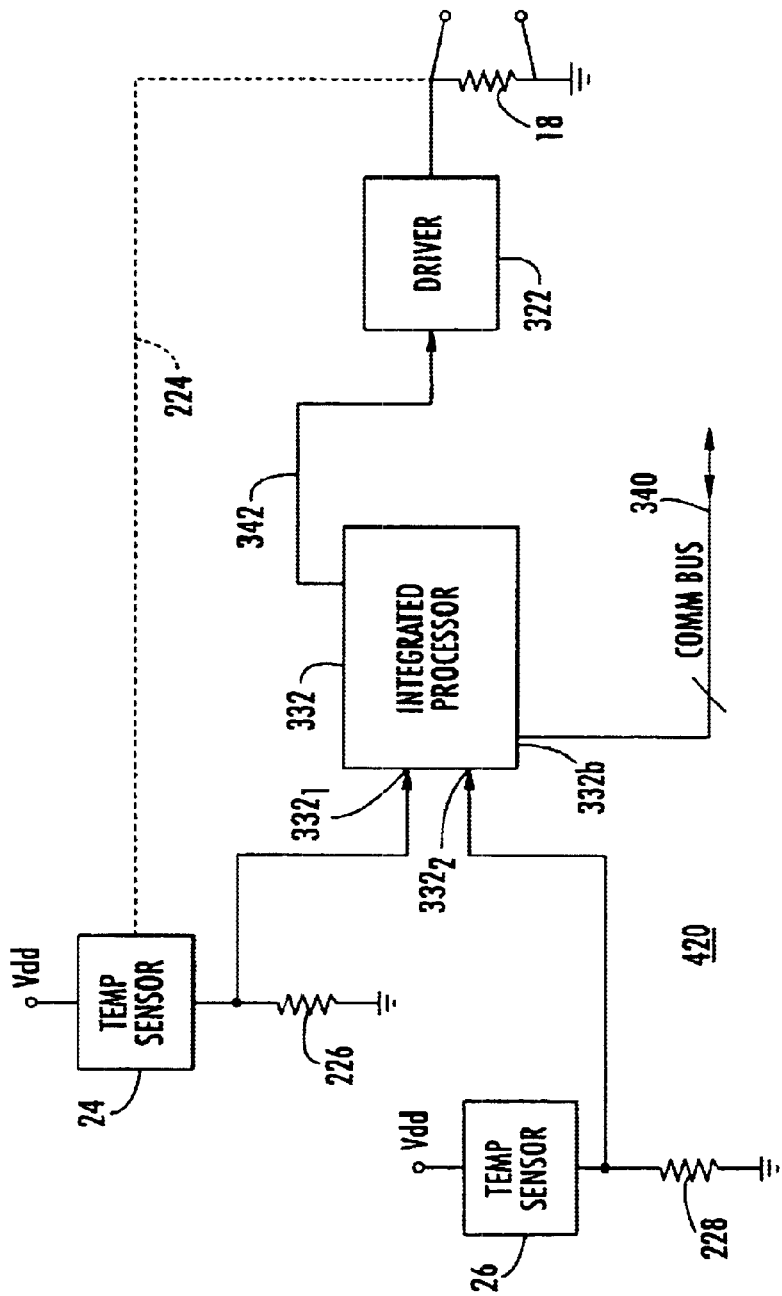
FIG. 4 is a simplified schematic diagram of a digital-based temperature controlling circuit using pulse-width modulation to eliminate the need for the DAC of FIG. 3.
Figure 5:
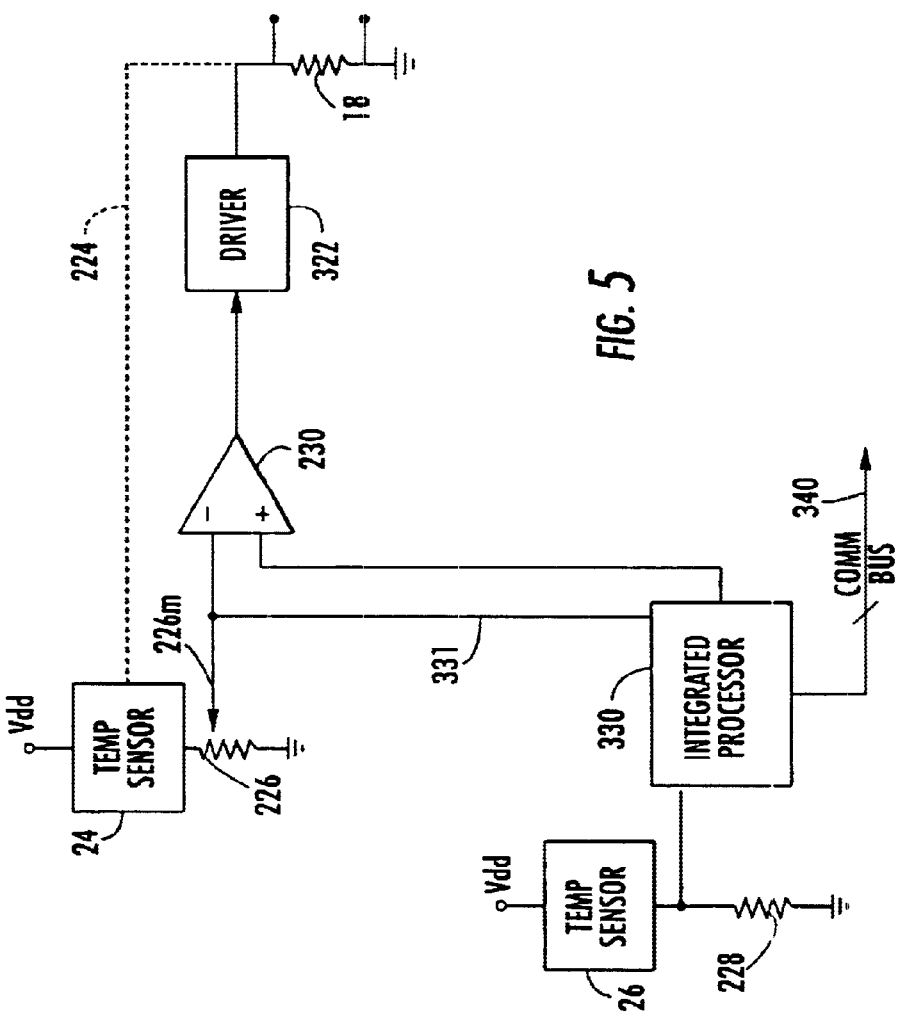
FIG. 5 is a simplified schematic diagram of a temperature controller in which one of the signals representing sensed temperature is digitized and reconverted to analog form.
Figure 6:
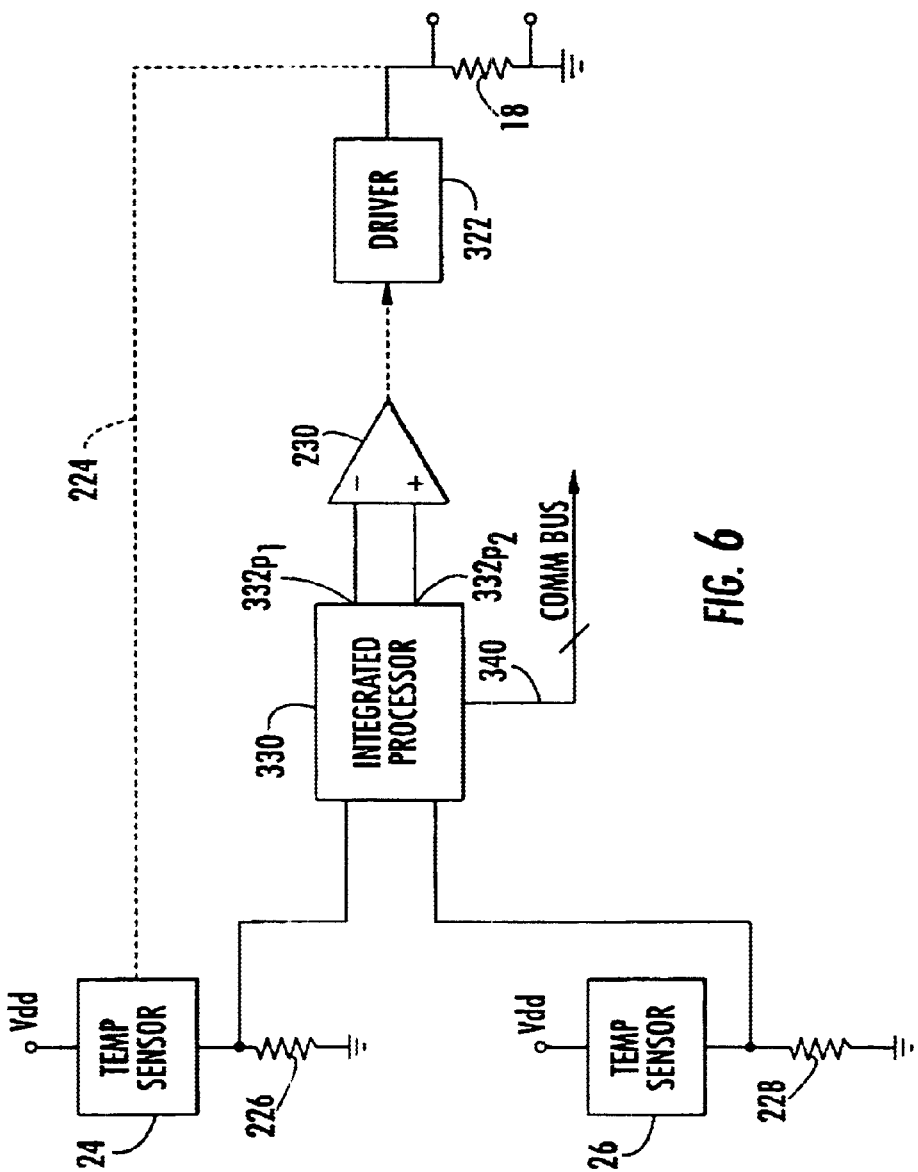
FIG. 6 is a simplified schematic diagram of a temperature controller similar to that of FIG. 5, in which both temperature signals are digitized.
Figure 7:
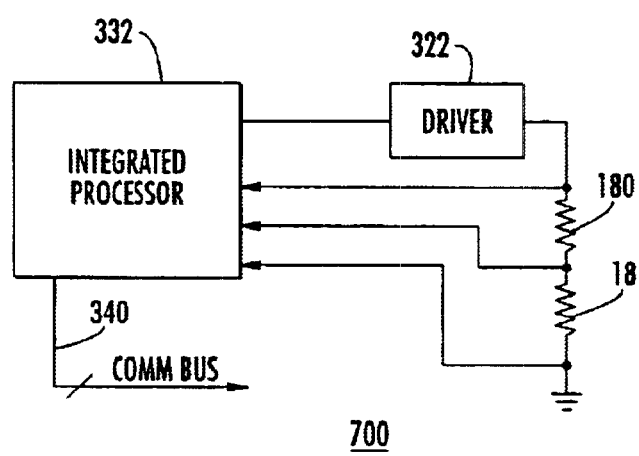
FIG. 7 is a detail of the processor and its connection for determination of heater temperature by the measurement of the heater electrical characteristics.
Figure 9A:
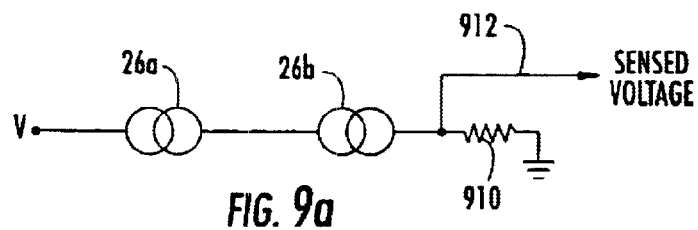
FIG. 9a is a simplified schematic diagram of the serial connection of temperature sensors in accordance with an aspect of the invention.
Figure 9B:
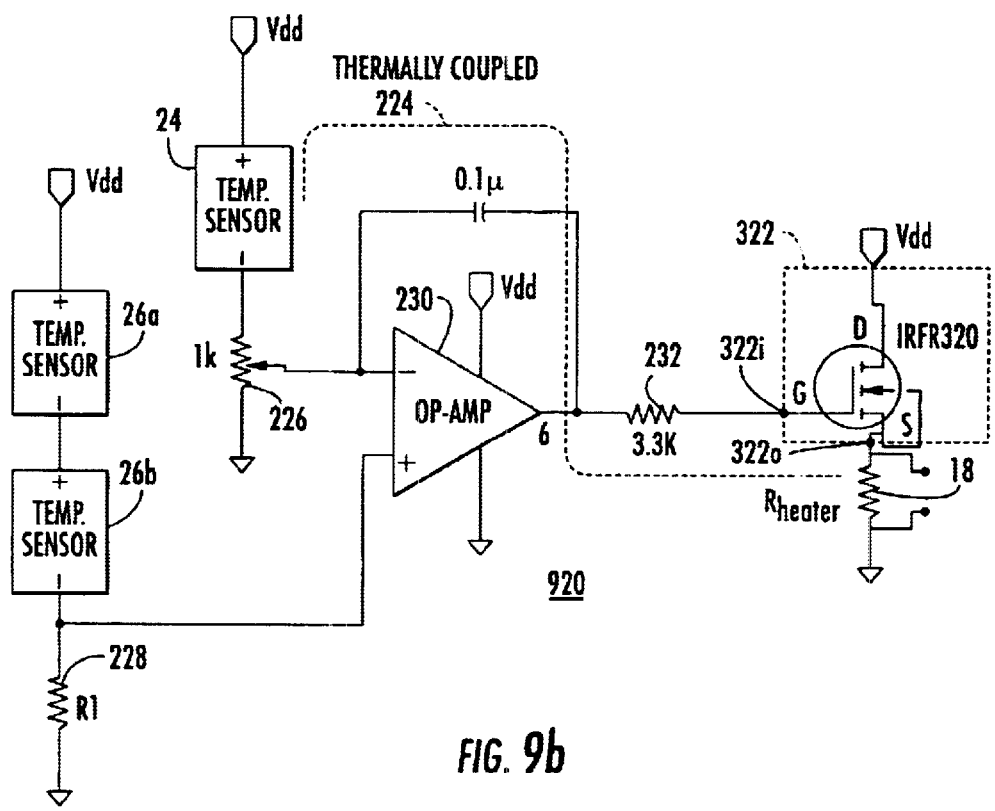

FIG. 9a illustrates a preferred arrangement for electrically connecting the temperature sensors 26a and 26b of FIG. 8. In FIG. 9a, temperature sensors 26a and 26b are each of the abovedescribed "two-terminal IC temperature transducer," which have a constant-current temperature characteristic which depends upon the sensed temperature, which have a high impedance providing constant current regardless of the applied voltage, and in which the magnitude of the constant current is a function of the sensed temperature. According to an aspect of the invention, sensors 26a and 26b are electrically connected in series, and the series-connected sensors are coupled to a voltage source V and to a sensing element, as illustrated in FIG. 9a. In FIG. 9a, the sensing element is a resistor 910, which converts the temperature-dependent constant current into a temperature-dependent constant voltage, which is taken off by a conductor 912 to a processor (not illustrated). The series electrical connection of these sensors results in the net current of the connected pair being controlled by that one of the sensors 26a and 26b which is at the lower temperature, because the sensor sensing the lower temperature limits the current to the lesser of the two possible values. The one of sensors 26a and 26b which senses the higher temperature will attempt to raise the current flow by effectively reducing its internal impedance, which will have little or no effect on that one of the sensors sensing the lower temperature. Consequently, the higher-temperature-sensing one of the sensors 26a and 26b will reduce its effective impedance to a level which results in little or no voltage thereacross, and it effectively drops out of the series circuit. As a result, the current flow in the series circuit of FIG. 9a will depend only (or principally) on that one of sensors 26a and 26b which senses the lesser temperature, which will be the one on the upstream side of heater 18 of FIG. 8. FIG. 9b is a schematic diagram of a control circuit 920 similar to control circuit 220 of FIG. 2a, using the reference temperature sensing arrangement of FIG. 9a. Just as the control circuit 220 raises the temperature of heater 18 above the reference temperature as determined by sensor 26, control circuit 920 raises the temperature of heater 18 above the lesser of the reference temperatures sensed by sensors 26a and 26b.

The series-electrically-connected, physically-on-alternate-sides-of-the-heater, constant-current transducer arrangement of FIG. 9a can be used in the arrangements of the controllers of FIG. 3, 4, 5, or 6, with a similar effect of rendering the flow magnitude measurement independent of flow direction.

Figure 10:
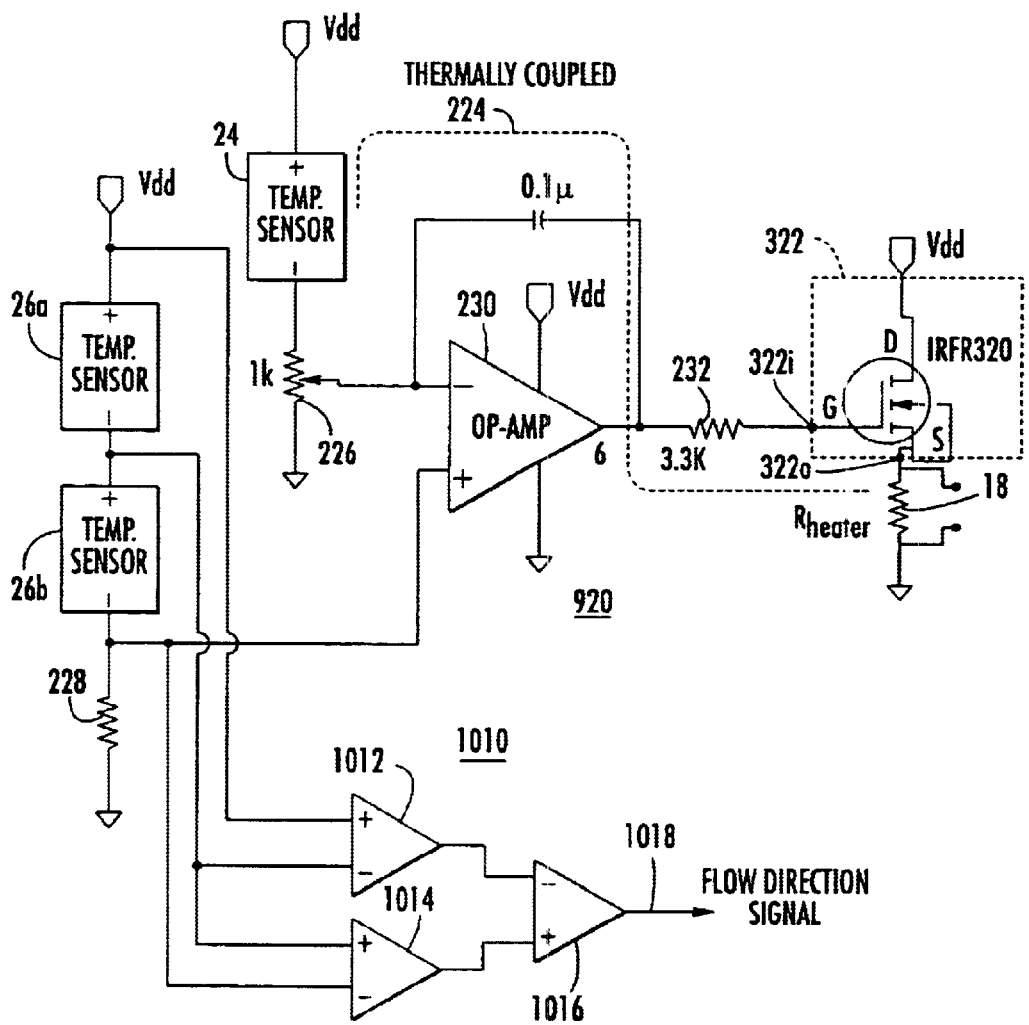
FIG. 10 is a simplified diagram illustrating additional circuits which provide a signal indicative of the direction of fluid flow.

It will be noted that, while the flow sensor controller described in conjunction with FIGS. 8, 9a, and 9b measures flow magnitude, no information relating to flow direction is produced. According to another aspect of the invention, the sensor signals are processed to produce information relating to the direction of fluid flow in path 12. In FIG. 10, the controller 920 is associated with an analog processing circuit 1010, including differential amplifiers or comparators 1012, 1014, and 1016. Differential amplifiers 1012 and 1014 sense the voltage across temperature sensors 26a and 26b, respectively, to produce normalized output signals responsive to the voltages across the sensors. As mentioned, the voltage is approximately zero across that sensor which is currently sensing the highest temperature, whereas the other will have a substantial voltage, depending upon the supply voltage Vdd. Thus, one or the other of amplifiers 1012 and 1014 will produce a larger output voltage, and the one producing the larger output voltage will depend upon which sensor senses the lower temperature, which in turn determines the flow direction. Comparator 1016 compares the outputs of amplifiers 1012 and 1014, to produce a single signal on signal path 1018 which is representative of the direction of fluid flow in the fluid path. For example, if the flow direction in FIG. 8 is represented by arrow 16a, temperature sensor 26a will sense a lower temperature than sensor 26b, because the fluid reaching sensor 26b is heated by heater 18. Consequently, sensor 26a of FIG. 10 will set the current by its high internal impedance, and a voltage which is a substantial portion of Vdd will appear across sensor 26a, while little voltage appears across sensor 26b. The output voltage from amplifier 1012 will be relatively large, while the output from amplifier 1014 will be relatively small. Comparator 1016 compares the outputs, and produces a logic low output voltage on path 1018 when the output of amplifier 1012 is greater than that of 1014, thereby representing fluid flow in the direction 16a of FIG. 8. If the fluid flow were to be in the opposite direction, namely direction 16*b* of FIG. 8, the output signal of comparator 1016 would produce a logic high signal on signal path 1018. Thus, processor 1010 of FIG. 10 processes the signals produced by the temperature sensors 26*a* and 26*b* to produce a signal representing the flow direction. The signal representing the flow direction can be coupled from controller 20 of FIG. 1 by way of bus 20*w* or from processor 332 by way of bus 340, together with all of the other information which is described above.

Figure 11:
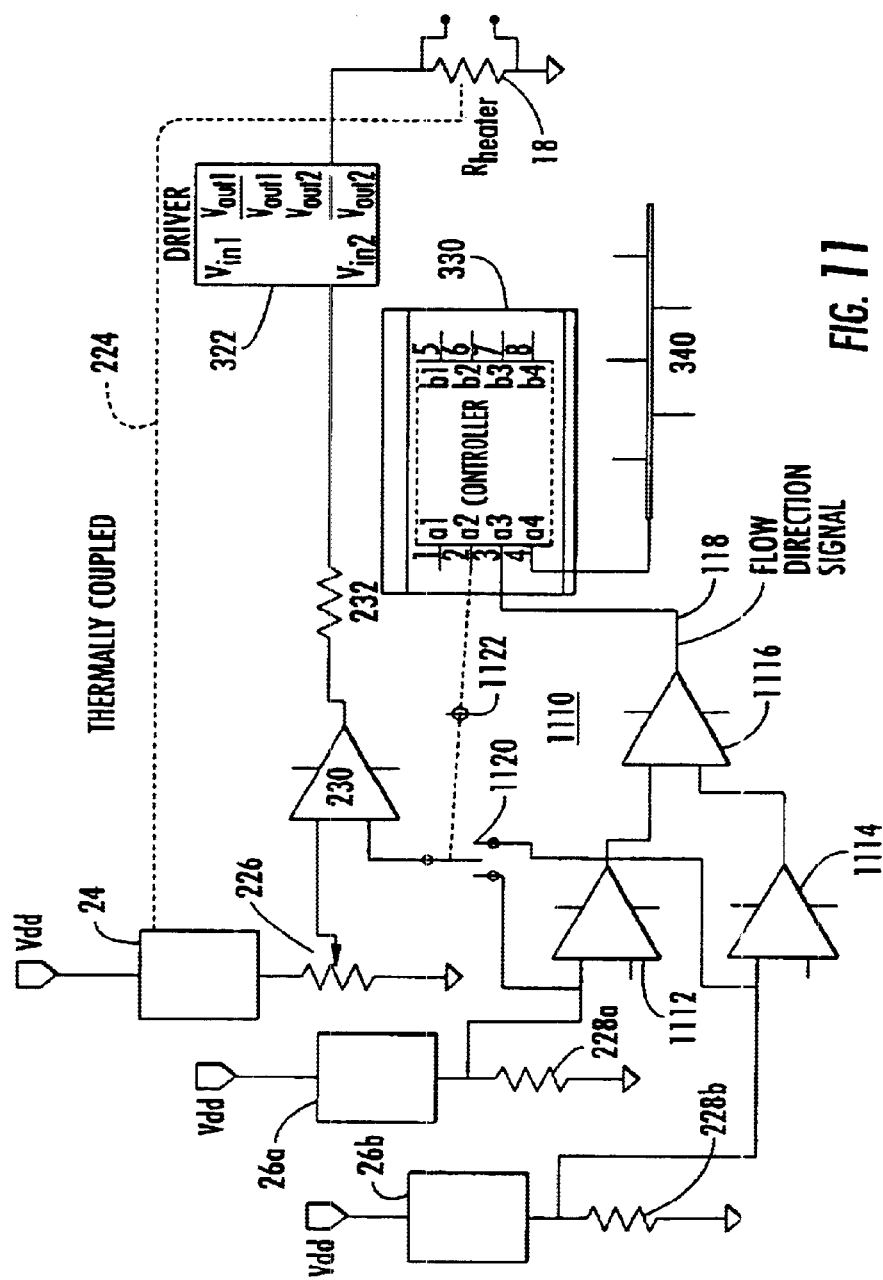
FIG. 11 is similar to FIG. 10, except that the temperature sensors are not connected in series.

FIG. 11 is analogous to FIG. 10 except that the temperature sensors are not connected in series, and in contrast separate sensing resistors 228*a* and 228*b* are used. The controller 920 (which is not shown) is associated with an analog processing circuit 1110, including differential amplifiers or comparators 1112, 1114, and 1116 as well as the controller 330, and the switch 1120. Differential amplifiers 1112 and 1114 sense the voltage across the resistors 228*a* and 228*b* connected to the temperature sensors 26*a* and 26*b*, respectively, to produce normalized output signals responsive to the voltages across the resistors. The voltage is higher across that sensor which is currently sensing the highest temperature, whereas the other will have a smaller voltage. Thus, one or the other of amplifiers 1112 and 1114 will produce a smaller output voltage, and the one producing the smaller output voltage will depend upon which sensor senses the lower temperature, which is turn determines the flow direction. Comparator 1116 compares the outputs of amplifiers 1112 and 1114, to produce a single signal on signal path 1118 which is representative of the direction of fluid flow in the fluid path. This signal on signal path 1118 is connected to the controller 330. This latter controller is also connected to the switch 1120. The phasing 1122 of this switch is controlled by the controller 330 based on the output of the comparator 1116 so that the sensor with the lower temperature is connected to the operational amplifier 230 providing the analog feedback. For example, if the flow direction in FIG. 8 is represented by arrow 16*a*, temperature sensor 26*a* will sense a lower temperature than sensor 26*b*, because the fluid reaching sensor 26*b* is heated by heater 18. Consequently, sensor 26*a* of FIG. 11 will set the analog feedback. The output voltage from amplifier 1112 will be relatively small, while the output from amplifier 1114 will be relatively large. Comparator 1116 compares the outputs, and produces a logic low output voltage on path 1118 which is then used by the controller 330 to set the switch to the appropriate position that connects the output of the sensor 26*a* to the op-amp 230. If the fluid flow were to be in the opposite direction, namely direction 16*b* of FIG. 8, the output signal of comparator 1116 produces a logic high signal on signal path 1118 that corresponds to the alternate case. Thus, processor 1110 of FIG. 11 processes the signals produced by the temperature sensors 26*a* and 26*b* to produce a signal representing the flow direction.

Figure 12:
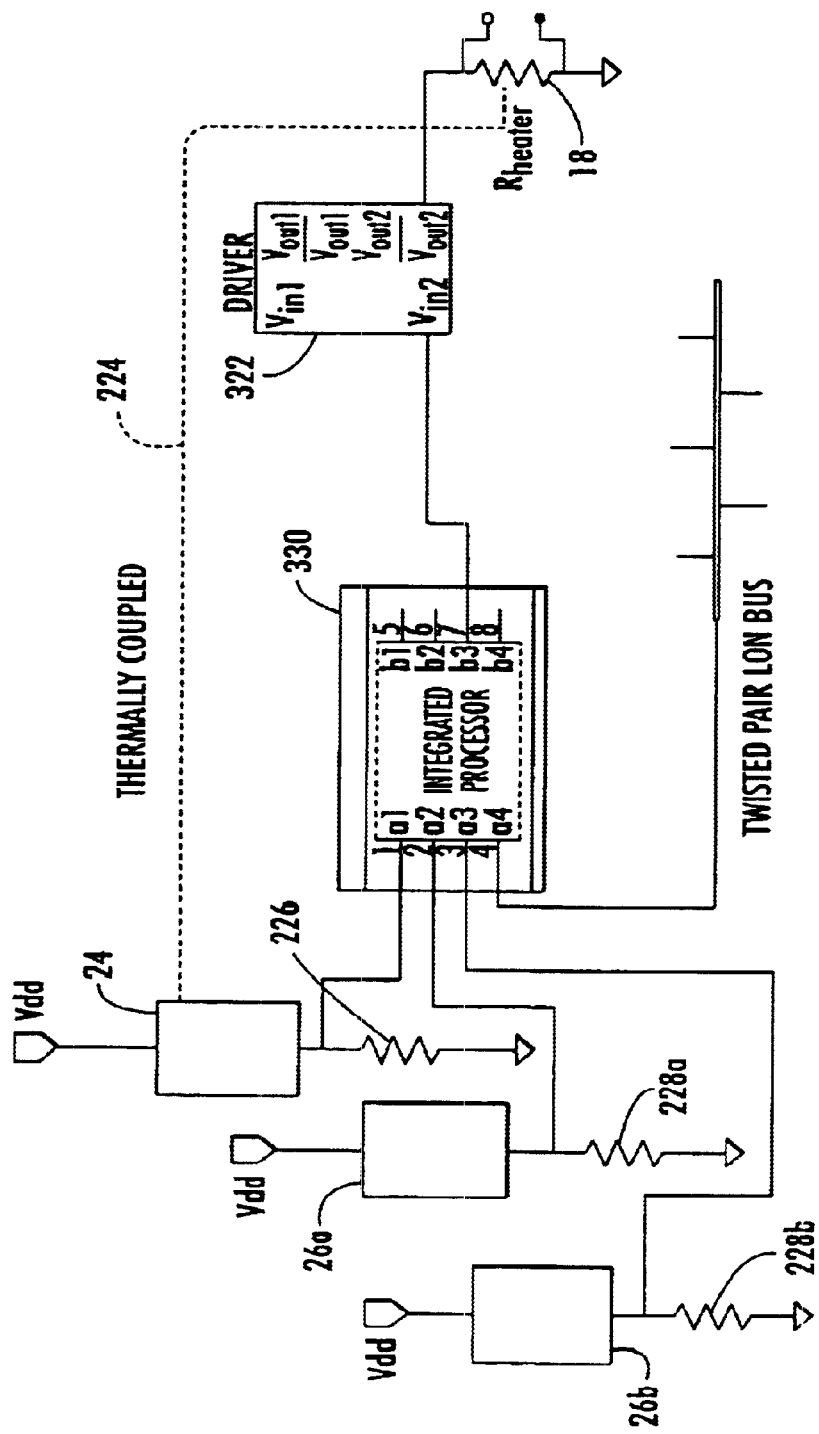
FIG. 12 is a digital-feedback equivalent of the arrangement of FIG. 11.

FIG. 12 is a digital feedback case of FIG. 11. In this case, the comparison of the voltages across the resistors 228*a* and 228*b* are carried out by the processor 330, and the output is set according to which one of the temperature sensors is providing lower reading. This is analogous to the digital feedback case except that the feed back is based on sensing the smaller of the two temperatures, as well as providing a flow direction value.

The bidirectional flow sensor according to the invention is advantageous by comparison with the rotating-propeller type of flow sensor, in that the rotating-propeller type need special steps in order to measure bidirectional flow. The ordinary differential-pressure type of flow sensor is inherently incapable of measuring bidirectionally, and the ball-in-tube type jams the ball into the small end of the tube in the case of reverse flow.

Other embodiments of the invention will be apparent to those skilled in the art. For example, the bidirectional flow sensor may be integrated with a pressure sensor as described in conjunction with copending application Ser. No. 09/349,576 filed Jul. 8, 1999 in the name of Hoyle et al.

Thus, according to an aspect of the invention, a method for determining the flow of a fluid through a region (36) includes the step of determining, at first and second spaced-apart locations (826*a*, 826*b*) along the path (12), the temperature of a fluid flowing in the path (12). The method also includes the step of applying power to a heater (18) thermally coupled to the path (12) at a location (818) lying between the first (826*a*) and second (826*b*) spaced-apart locations, for raising the temperature of the heater (18) by a fixed temperature differential above the lesser of the temperature of the fluid at the first (826*a*) and second (826*b*) locations, and, using at least information equivalent or corresponding to one of the specific heat of the fluid, the power required to sustain the temperature differential, the power transfer characteristics per unit area of the heater (18) to the fluid, and the exposed area of the heater (18), determining the fluid flow. In a particular mode, the method includes the step of determining the volumetric flow from the fluid flow and information equivalent to the cross-sectional area of the path (12). In another mode, the method includes the step of determining the mass flow from the volumetric flow and information equivalent to the mass density of the fluid.

A bidirectional fluid flow sensor (800) according to an aspect of the invention includes a path (12) for the flow of fluid in mutually opposite first (16*a*) and second (16*b*) directions, and a heater (18) thermally coupled to the path (12), for transferring heat to the fluid at a first location (818) along the path (12). A first electrically responsive temperature sensor (26*b*) is located downstream from the heater (18) for the first direction of fluid flow. The first temperature sensor (26*b*) has a temperature-dependent constant-electrical-current characteristic. Put another way, it produces a constant current (independent of the applied voltage within a given range of voltages) at any given temperature, and the sensed temperature determines the magnitude of the current. A second electrically responsive temperature sensor (26*a*) is located downstream from the heater (18) for the second direction (16*b*) of fluid flow, and the second temperature sensor (26*a*) has a temperature-dependent constant-electrical-current characteristic, which may differ from that of the first electrically responsive temperature sensor. Ideally, this difference is attributable to a temperature difference between the fluid at the first (16*a*) and second (16*b*) locations. An electrical coupler or circuit (V of FIG. 9*a*, 910) is electrically coupled to the first (26*b*) and second (26*a*) electrically responsive temperature sensors, for coupling the sensors in electrical series in a manner which results in a electrical combined sensor current which depends only on that one of the sensors providing the lesser constant electrical current. In this fashion, the electrical current through the series-connected temperature sensors equals the electrical current which would be produced by that one of the sensors producing the least current. In a particular embodiment of the invention in which the series-connected temperature sensors are solid-state two-terminal integrated-circuit temperature transducers operable with a direct-voltage supply in the range of about 4 to 30 volts, the electrical current through the series-connected sensors equals that current which would occur through the sensor sensing the lower temperature if it were not connected in series. The bidirectional flow sensor includes a controller (920) coupled to the electrical coupler (V, 910) and to the heater (18), for controlling the power applied to the heater (18) in a manner which tends to maintain the heater (18) at a fixed temperature difference above the temperature sensed by that one of the sensors providing the lesser constant electrical current. A processor (332) is provided for converting the power applied to the heater (18) into an indication of flow.

In a particularly advantageous embodiment of the bidirectional flow sensor according to an aspect of the invention, the controller (920) comprises a heater (18) temperature sensor (24) coupled to the heater (18), for determining the temperature of the heater (18). This heater (18) temperature sensor may include an electrical resistor associated with the heater (18), and a processing arrangement for determining the electrical resistance of the electrical resistor. In the most preferred embodiment, the electrical resistor and the heater (18) are one and the same element, in which case the heater (18) temperature sensor further comprises a resistance determining arrangement (700) coupled to the electrical resistor for measuring the electrical resistance of the heater (18).

Other salient aspects of the invention lie in (a) the controller comprising a memory (21) preprogrammed with a value corresponding to the cross-sectional area of the path (12), so that the flow determination is in the form of one of mass quantity per unit time and volume per unit time, (b) the path (12) being associated with a pipe (14) having a peripheral wall (33, 34), and the heater (18) being in the form of a peripheral structure surrounding the peripheral wall (34), and in thermal contact therewith, (c) the peripheral wall (33) of the pipe (14) being made from conventional materials having a thickness (T) commensurate with the pressure and temperature of the fluid, except in the region (36) in which the heater (18) is thermally coupled, in which region (36) the peripheral wall (34) is made from a material having higher strength than the conventional materials, of a thickness (t) less than the commensurate thickness.

What is claimed is:

1. A bidirectional flow sensor for determining the flow magnitude in a fluid path, said flow sensor comprising:
   a path for the flow of fluid in mutually opposite first and second directions;
   heating means thermally coupled to said path, for transferring heat to said fluid at a first location along said path;
   a first electrically responsive temperature sensor located downstream from said heating means for said first direction of fluid flow, said first temperature sensor having a temperature-dependent electrical characteristic;
   a second electrically responsive temperature sensor located downstream from said heating means for said second direction of fluid flow, said second temperature sensor having a temperature-dependent electrical characteristic;
   control means coupled to said first and second temperature sensors and to said heating means, for controlling the power applied to said heating means in a manner which tends to maintain said heating means at a fixed temperature difference above the temperature of that one of said sensors having said electrical characteristic indicative of the lesser temperature; and
   processing means for converting a signal representing said power applied into a quantitative indication of at least one of volumetric and mass fluid flow.

2. A flow sensor according to claim 1, wherein said electrical characteristic is resistance.

3. A flow sensor according to claim 1, wherein said electrical characteristic is magnitude of constant current.

4. A flow sensor according to claim 3, wherein said first and second electrically responsive temperature sensors are electrically connected in series.

5. A bidirectional fluid flow sensor, said sensor comprising:
   a path for the flow of fluid in mutually opposite first and second directions;
   heating means thermally coupled to said path, for transferring heat to said fluid at a first location along said path;
   a first electrically responsive temperature sensor located downstream from said heating means for said first direction of fluid flow, said first temperature sensor having a first temperature-dependent constant-electrical-current characteristic;
   a second electrically responsive temperature sensor located downstream from said heating means for said second direction of fluid flow, said second temperature sensor having a second temperature-dependent constant-electrical-current characteristic;
   sensor coupling means electrically coupled to said first and second electrically responsive temperature sensors, for coupling said sensors in electrical series in a manner which results in a electrical combined sensor current which depends only on that one of said sensors providing the lesser constant electrical current;
   control means coupled to said sensor coupling means and to said heating means, for controlling the power applied to said heating means in a manner which tends to maintain said heating means at a fixed temperature difference above the temperature of that one of said sensors providing the lesser constant electrical current; and
   processing means for converting a signal representing said power applied into an indication of flow.

6. A flow sensor according to claim 5, wherein said constant-electrical-current characteristic of said first and second electrically responsive temperature sensors has a constant current which increases with temperature, whereby said electrical combined sensor current represents the temperature of that one of said first and second temperature sensors which is at the lower temperature.

7. A flow sensor according to claim 5, wherein said control means comprises a heater temperature determining means coupled to said heating means, for determining the temperature of said heating means.

8. A flow sensor according to claim 7, wherein said heater temperature determining means comprises an electrical resistor associated with said heating means, and means for determining the electrical resistance of said electrical resistor.

9. A flow sensor according to claim 7, wherein said heating means comprises an electrical resistor, and said heater temperature determining means further comprises means coupled to said electrical resistor for measuring the electrical resistance of said heating means.

10. A flow sensor according to claim 5, wherein said control means comprises a memory preprogrammed with a value corresponding to the cross-sectional area of said path, and said flow determination is in the form of one of mass quantity per unit time and volume per unit time.

11. A flow sensor according to claim 5, wherein said path is associated with a pipe having a peripheral wall, and wherein said heating means is in the form of a peripheral structure surrounding said peripheral wall, and in thermal contact therewith.

12. A flow sensor according to claim 11, wherein said peripheral wall of said pipe is made from conventional materials having a thickness commensurate with the pressure and temperature of said fluid, except in the region in which said heating means is thermally coupled, in which region said peripheral wall is made from a material having higher strength than said conventional materials, of a thickness less than said commensurate thickness.

13. A sensor according to claim 5, further comprising processing means coupled to said first and second electrically responsive temperature sensors, for comparing the voltages at said sensors, and for generating a flow direction signal representative of the direction of fluid flow in said path.

14. A method for determining the flow of a fluid through a region, said method comprising the steps of:

determining the temperature of a fluid flowing in a path, at first and second spaced-apart locations along said path;

applying power to a heater thermally coupled to said path at a location lying between said first and second spaced-apart locations, for raising the temperature of said heater by a fixed temperature differential above the lesser of the temperature of the fluid at said first and second locations; and from a signal representing said power applied to said heater, determining the quantitative value of one of volumetric and mass fluid flow.

15. A method according to claim 14, further comprising the step of comparing signals related to said temperature of said fluid at said first and second spaced-apart locations, for determining the direction of fluid flow in said path.

16. A method according to claim 14, further comprising the step of determining the volumetric flow from said fluid flow and information equivalent to the cross-sectional area of said path.

17. A method according to claim 16, further comprising the step of determining the:mass flow from said volumetric flow and information equivalent to the mass density of said fluid.

18. A bidirectional fluid flow sensor, said sensor comprising:

a path for the flow of fluid in mutually opposite first and second directions;

a heater thermally coupled to said path, for transferring heat to said fluid at a first location along said path;

a first electrically responsive temperature sensor located downstream from said heater for said first direction of fluid flow, said first temperature-sensor having a temperature-dependent constant-electrical-current characteristic;

a second electrically responsive temperature sensor located downstream from said heater for said second direction of fluid flow, said second temperature sensor having a temperature-dependent constant-electrical-current characteristic which may differ from that of said first electrically responsive temperature sensor;

an electrical coupler electrically coupled to said first and second electrically responsive temperature sensors, for coupling said sensors in electrical series in a manner which results in a electrical combined sensor current which depends only on that one of said sensors providing the lesser constant electrical current;

a controller coupled to said electrical coupler and to said heater, for controlling the power applied to said heater in a manner which tends to maintain said heater at a fixed temperature difference above the temperature of that one of said sensors providing the lesser constant electrical current; and a processor for converting said power applied into an indication of flow.

19. A flow sensor according to claim 18, further comprising processing means coupled to said first and second electrically responsive temperature sensors, for generating a signal representative of the direction of fluid flow in said path.

20. A flow sensor according to claim 18, wherein said constant-electrical-current characteristic of said first and second electrically responsive temperature sensors has a constant current which increases with temperature, whereby said electrical combined sensor current represents the temperature of that one of said first and second temperature sensors which is at the lower temperature.

21. A flow sensor according to claim 18, wherein said controller comprises a heater temperature sensor coupled to said heater, for determining the temperature of said heater.

22. A flow sensor according to claim 20, wherein said heater temperature sensor comprises an electrical resistor associated with said heater, and a processing arrangement for determining the electrical resistance of said electrical resistor.

23. A flow sensor according to claim 21, wherein said heater comprises an electrical resistor, and said heater temperature sensor further comprises a resistance determining arrangement coupled to said electrical resistor for measuring the electrical resistance of said heater.

24. A flow sensor according to claim 18, wherein said controller comprises a memory preprogrammed with a value corresponding to the cross-sectional area of said path, and said flow determination is in the form of one of mass quantity per unit time and volume per unit time.

25. A flow sensor according to claim 18, wherein said path is associated with a pipe having a peripheral wall, and wherein said heater is in the form of a peripheral structure surrounding said peripheral wall, and in thermal contact therewith.

26. A flow sensor according to claim 25, wherein said peripheral wall of said pipe is made from conventional materials having a thickness commensurate with the pressure and temperature of said fluid, except in the region in which said heater is thermally coupled, in which region said peripheral wall is made from a material having higher strength than said conventional materials, of a thickness less than said commensurate thickness.

* * * * *